United States Patent
Hoge et al.

(10) Patent No.: US 6,195,715 B1
(45) Date of Patent: Feb. 27, 2001

(54) INTERRUPT CONTROL FOR MULTIPLE PROGRAMS COMMUNICATING WITH A COMMON INTERRUPT BY ASSOCIATING PROGRAMS TO GP REGISTERS, DEFINING INTERRUPT REGISTER, POLLING GP REGISTERS, AND INVOKING CALLBACK ROUTINE ASSOCIATED WITH DEFINED INTERRUPT REGISTER

(75) Inventors: Stephen Hoge, Santa Cruz; Eric W. Lange, Campbell, both of CA (US)

(73) Assignee: Creative Technology Ltd., Singapore (SG)

( * ) Notice: Subject to any disclaimer, the term of this patent is extended or adjusted under 35 U.S.C. 154(b) by 0 days.

(21) Appl. No.: 09/192,169

(22) Filed: Nov. 13, 1998

(51) Int. Cl.[7] .............................. G06F 13/14; G06F 13/22
(52) U.S. Cl. ............................. 710/47; 710/46; 710/733; 710/736; 710/739
(58) Field of Search ..................................... 710/1, 47, 46, 710/733, 736, 739

(56) References Cited

U.S. PATENT DOCUMENTS

| | | | |
|---|---|---|---|
| 4,099,255 | * 7/1978 | Stanley et al. | 364/900 |
| 4,626,987 | 12/1986 | Renninger | 364/200 |
| 5,325,536 | 6/1994 | Chang et al. | 395/725 |
| 5,491,796 | * 2/1996 | Wanderer et al. | 395/200.09 |
| 5,568,643 | 10/1996 | Tanaka | 395/739 |
| 5,664,200 | 9/1997 | Barlow et al. | 395/741 |
| 5,812,779 | * 9/1998 | Ciscon et al. | 395/200.53 |
| 5,815,733 | 9/1998 | Anderson et al. | 395/868 |
| 6,111,894 | * 8/2000 | Bender et al. | 370/469 |

* cited by examiner

Primary Examiner—Thomas C. Lee
Assistant Examiner—Rehana Penveen
(74) Attorney, Agent, or Firm—Townsend and Townsend and Crew LLP

(57) ABSTRACT

A method and an system for communication between components of a computer system, such a plurality of computer soft-ware applications stored in a memory, that features uniquely associating each of the plurality of computer applications with a general purpose registers. Each of the general-purpose registers is in data communication with a common interrupt port of a processor via an interrupt control register and has a predetermined value associated therewith. A hardware interrupt is initiated by the interrupt control register in response to varying the predetermined value associated with one or more of the general purpose registers. In response to the interrupt, the processor polls each of the general purpose registers and initiates a callback function to the application associated with the general purpose register with the varied predetermined value. Although the predetermined value may consist of any number, typically the predetermined value is zero.

20 Claims, 2 Drawing Sheets

INTERRUPT CONTROL FOR MULTIPLE PROGRAMS COMMUNICATING WITH A COMMON INTERRUPT BY ASSOCIATING PROGRAMS TO GP REGISTERS, DEFINING INTERRUPT REGISTER, POLLING GP REGISTERS, AND INVOKING CALLBACK ROUTINE ASSOCIATED WITH DEFINED INTERRUPT REGISTER

BACKGROUND OF THE INVENTION

The present invention relates generally to a method and apparatus controlling communications between various components of a computer system. More particularly, the present invention relates to interrupt control in a computer system.

Computer systems typically include numerous components, such as application software, peripheral devices and internal circuitry. In order for these components to function properly, each must communicate with the system's processor without interfering with the remaining components.

During normal operation, the processor constantly processes internal software commands. When a peripheral device, such as a keyboard, requires processor time, an external event occurs. To obtain the necessary processor time, the keyboard initiates an "interrupt", halting the processor from the aforementioned processes so that input from the keyboard can he decoded by the computer system employing the processor. Specifically, upon receiving an interrupt signal, the processor should halts routine processing, services the interrupting signal, and then returns to the pre-interrupt processing.

A typical computer system will have a set of interrupt request lines. If the processor detects an interrupt signal at one of these interrupt request lines, the processor completes current software instructions and then halts normal operation. Such an interrupt can be generated by the keyboard in response to user initiated keypad input. The processor will then jump to a software routine stored in memory, hereinafter to be called an "Interrupt Service Routine" or "ISR." Depending on which interrupt request line of the processor receives the interrupt signal, the processor determines a jump location and then begins execution of an ISR located at that memory location. Interrupt Service Routines may be considered as being device specific software programs that integrate the operation of peripheral devices and normal processor operation. At the end of the Interrupt Service Routine (ISR), the ISR sends a command to the processor to restore the pre-existing condition of the processor. Thus, interrupts enable transfer of control from one program to another, to be initiated by an event external to the computer. Since interrupts can occur at any time, frequently the execution of events by the processor are altered, creating interactions between software and hardware that were not anticipated in the design of the computer system.

Interrupt requests typically originate from two sources. One source of interrupt requests generates an interrupt event that does not need to be cleared. For example, in a Real Time Clock (RTC), the interrupt events generated are pulses and are inherently self-resetting. Another origin of interrupt requests requires servicing to clear or reset the interrupt event. In this manner, an interrupt event is generated that requires an action to be performed subsequent to the generating event to clear the interrupt request. An example of this type of interrupt request is a keyboard that, by pressing a key, causes a level shift signal to be generated. The level shift signal remains at a predetermined level until the keyboard is serviced by an ISR to determine which key was pressed. Resetting its signal level to allow the occurrence of another keyboard-generated event to be processed then clears the interrupt event.

To ensure proper computer system operation it is necessary to make sure that the device generating he interrupt event is serviced and cleared before a subsequent interrupt event is generated, i.e., to avoid interrupt confusion. Otherwise the computer system resources might become overburdened and data may be lost. Prior art attempts to avoid data loss due to interrupt confusion includes preventing the generation of a second interrupt by employing a disabling command as the first instruction of the ISR. The interrupt would then be re-enabled before returning from the interrupt. However, this solution is not effective if more than one origin of interrupts is present. Another prior art solution with avoiding interrupt confusion is to have the processor automatically disable the interrupts before starting the execution of the ISR. A third option uses level transition interrupt where the interrupt detecting hardware detects only the edge of the interrupt transition, so that only one such transition is seen for each interrupt.

The problems associated with interrupt confusion are exacerbated if more than one device is connected to a common interrupt of the processor. A situation may arise in which more than one device may request an interrupt during the same time interval. Therefore, the computer system design must take into account how to recognize the origin of an interrupt, as well as, how the processor will determine which ISR to run for each interrupt origins, and how to prioritize the interrupts to determine the hierarchical order in which interrupts are be handled.

Prior art solutions concerning with peripheral devices connected to a common processor terminal are identified by the addresses in the memory map of the computer system. The peripheral device interrupt request can be connected to the inputs of an OR circuit. The output of the circuit transmits the device interrupt requests to the processor interrupt terminal. Because the output of the OR circuit is essentially shared by the devices requesting interrupts, there could always be another device interrupting on the same line without the processor knowing about it. A solution to this problem has used a method where status registers, physically located on each of the connected devices, are set by a corresponding interrupt request signal. The outputs of the individual status registers are OR'ed to indicate the presence of interrupt signals. During an active interrupt, if an interrupt request is signaled by another device, the request is stored in the associated status register. Upon completing the servicing of the first interrupt, the second interrupting device will still be indicating the interrupt status of the second device at the OR circuit output. The computer system can reset these registers to clear the interrupts by writing to the individual address location identifying the register. Depending on the number of interrupting devices, this method may require a large number of computer system address locations. This in turn can increase the complexity of the decoding scheme used in the processor architecture. Another disadvantage of using such an implementation is the time required for polling the registers to determine their status. An alternative design is for the device to send a code or "vector" along with its interrupt signal. The processor can then immediately start executing the ISR pointed to by the code. In a computer that has multiple interrupt request lines, vectored interrupts may be implemented by simply associating a unique starting address with each line. The two alternatives can be mixed; the vectors can identify groups of inputs from which the processor can identify a particular one by polling.

A problem associated with both approaches is that there are inherent delays in the processing of interrupts. These delays can cause a subsequent interrupt to be missed. One such delay results from the necessity in some computer systems to globally disable interrupts upon a valid interrupt request. During this period, until re-enablement of the interrupts, other interrupting devices cannot be identified. Computer system delays can arise during critical sequences when interrupts are disabled during the time required to poll the interrupting devices, the time required to complete the current processor instruction sequence before jumping to the interrupt, and due to the necessity to process higher priority interrupts first. Since the processor may require the use of the system bus to process its normal functions during this delay, the interrupting device should not be allowed to put data on the bus until the processor is ready to receive it. This can be achieved through the use of additional control signals. As soon as the processor is ready to service the interrupt, it asserts a control signal. This in turn causes the requesting device to communicate the interrupt.

What is needed, therefore, is a technique that allows interrupt requests from multiple components connected to a common interrupt port of a processor without significantly delaying data transfer and without losing data.

SUMMARY OF THE INVENTION

Provided are a method and an system for communication between components of a computer system, such a plurality of computer applications stored in a memory, that features uniquely associating each of the plurality of computer applications with a purpose registers. Each of the general-purpose registers is in data communication with a common interrupt port of a processor via an interrupt control registering and has a predetermined value associated therewith. A hardware interrupt is initiated by the interrupt control register in response to varying the predetermined value associated with one or more of the general purpose registers. In response to the interrupt, the processor polls each of the general purpose registers and initiates a callback function to the application associated with the general purpose register with the varied predetermined value. Although the predetermined value may consist of any number, typically the predetermined value is zero.

DESCRIPTION OF THE SPECIFIC EMBODIMENTS

Figure 1:
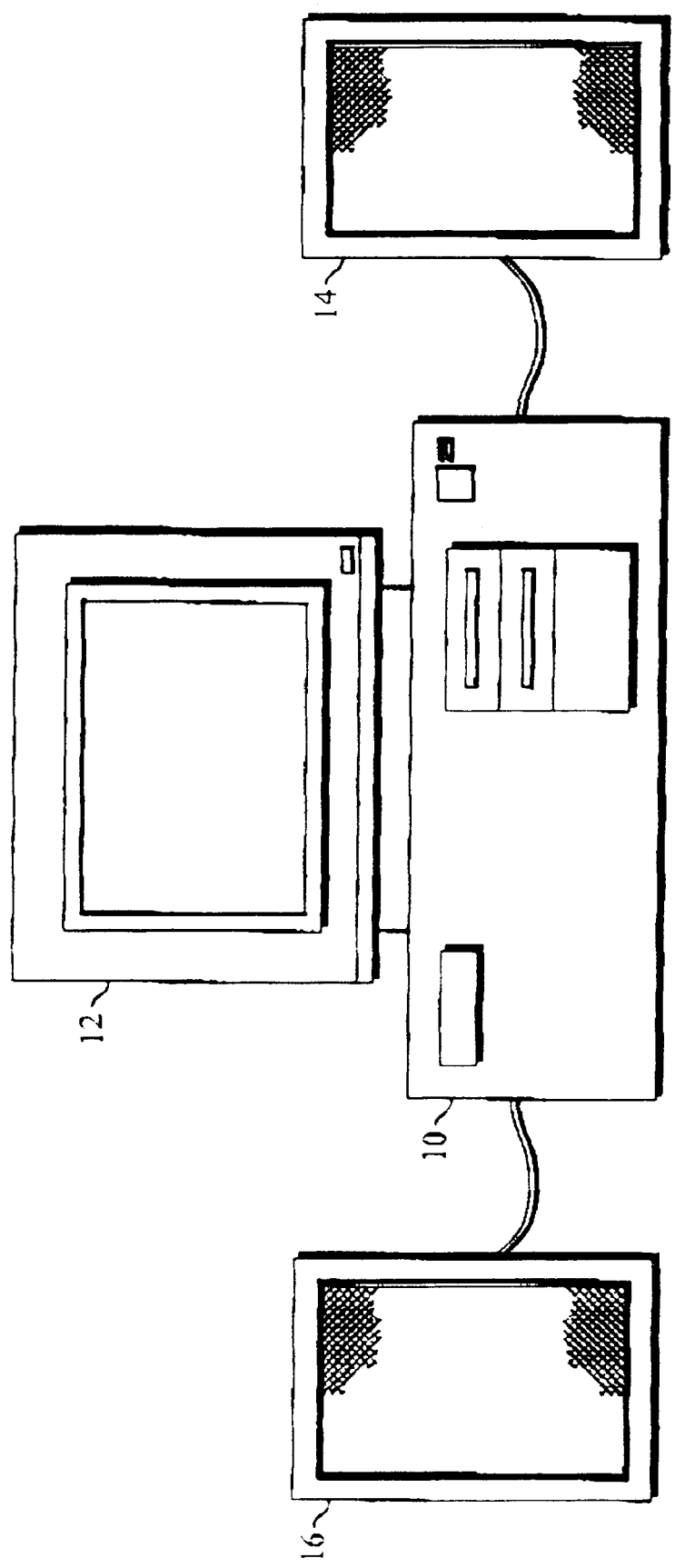
FIG. 1 is a plan view of a computer system in accordance with the present invention.
Figure 2:
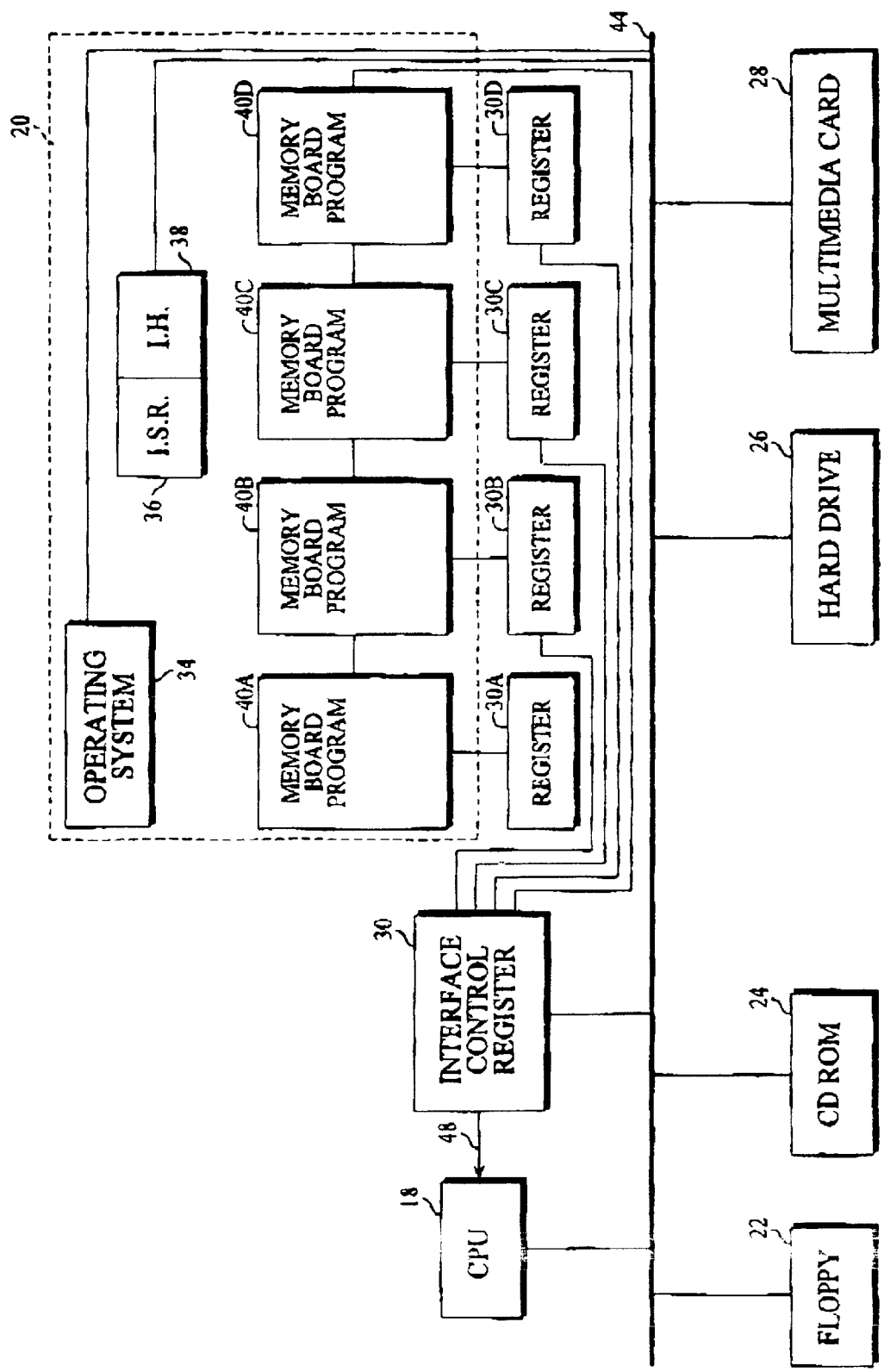
FIG. 2 is a simplified block diagram of the computing architecture of the computer system shown in FIG. 1.

Referring to both FIGS. 1 and 2, a multimedia personal computer system 10 includes a monitor 12 and left and right speakers 14 and 16. The computer system 10 is an exemplary system that can include a sound processor having an audio data memory that may employ the present invention. The relevant portion of the computer system 10's, internal architecture includes a processor 18, a memory 20, a floppy drive 22, a CD-ROM drive 24, a hard drive 26, a multimedia card 28, an interrupt control register 30 and a plurality of general-purpose registers 32a, 32b, 32c and 32d. Although four general-purpose registers are shown, any number may be included. Also included with the computer system 10 is a operating system 34, interrupt service routines (ISR) 36, an interrupt handler (IH) 38 and a plurality of DSP programs, such as software applications 40a, 40b, 40c and 40d. Although four software applications are shown, any number may be included. Typically, the software applications are stored in memory 20 at different addresses. The software applications 40a, 40b, 40c and 40d are shown separately to indicate that each is associated with a range of addresses of the memory that differs from the addresses associated with the remaining software applications.

Data is transferred between the various components of the computer system 10 over a bus system 44. Of course, many possible computer configurations could be used with the invention. In fact, the present invention is not limited to the context of personal computers and finds application in video games, cinema sound systems and many other systems. As a result, software applications 40a, 40b, 40c and 40d may comprise of word-processors, graphics of digital signal processing programs. Moreover, the present invention may be used with individual or multiple simultaneously running software applications. In the case of multiple simultaneously running programs, the processor 18 is considered to be running in a "multitasking environment." In a multitasking environment, if the software applications are each running individual software threads, the system may further be called "multithreaded."

The interrupt control register 30 is connected to receive and process interrupts generated by a variety of origins. For example, the interrupt register 30 may receive interrupts generated from one or more of the plurality of software applications 40a, 40b, 40c and 40d. To that end, each of the software applications 40a, 40b, 40c and 40d are in electrical communication with the interrupt control register 30. After receiving an interrupt signal, the interrupt control register 30 processes the same using control commands from ISR's 36 and IH 38 received across the system bus 44, and communicates an interrupt signal to the provessor 18 over interrupt bus 48. The ISR's 36 are specific software programs that integrate the operation of the application programs 40a, 40b, 40c and 40d a floppy drive 22, a CD-ROM drive 24, a hard drive 26, a multimedia card 28, and processor 18. The IH (Interrupt Handler) 38 is an additional software routine that controls the order of scanning for the source of the interrupts. The order in which the ISR's 36 are executed is controlled by the operating system 34, according to priorities assigned by applications programs 40a, 40b, 40c and 40d. In the preferred embodiment, the processor 18 is an EMU1OKI/RCHIP digital signal processor and the operating system 34 is the KX8210 operating system, both of which are produced by Creative Labs, Inc. of Milpitas, Calif.

A problem addressed by the computer system 10 concerns sharing of a single hardware interrupt source among multiple software applications, shown as 40a, 40b, 40c and 40d for transmission of data to processor 18. To that end, one or more of the plurality of software applications 40a, 40b, 40c and 40d are uniquely associated with one of the general purpose registers 30a, 30b, 30c and 30d. The association between the general purpose registers 30a, 30b, 30c and 30d and the software applications 40a, 40b, 40c and 40d are such that each of the software applications 40a, 40b, 40c and 40d are associated with one of the general-purposes registers 30a, 30b, 30c and 30d so as to be different from the general purpose registers 30a, 30b, 30c and 30d associated with the remaining software applications 40a, 40b, 40c and 40d. Specifically, each of the software applications 40a, 40b, 40c and 40d are associated with a unique range of addresses of the memory 20, different from the range of memory addresses are associated with the remaining software applications 40a, 40b, 40c and 40d. Each of the general-purpose registers 30a, 30b, 30c and 30d is assigned a predetermined value, typically zero.

When one or more of the software applications 40a, 40b, 40c and 40d has data to transmit to the processor 18 it sets the general-purpose associated therewith to a nonzero value. This non-zero value then sets an interrupt bit in the interrupt control register 30. The interrupt control register then triggers a hardware interrupt of processor 18 over interrupt bus 48.

Upon receipt of the operating system 34 searches through the general-purpose registers 30a, 30b, 30c and 30d. For each nonzero value sensed, the operating system 34 invokes the ISR36 to execute a callback routine, with the non-zero value being passed as a value. Thereafter, the operating system automatically resets the register to zero 30a, 30b, 30c and 30d and clears the interrupt bit in the interrupt control register 30.

Since each software application 40a, 40b, 40c and 40d is uniquely associated with one of the general-purpose registers 30a, 30b, 30c and 30d, the non-zero value may not be overwritten by the remaining software applications 40a, 40b, 40c and 40d. This allows each software application 40a, 40b, 40c and 40d to perform flow control by checking the general-register associated therewith to ensure a zero is present before writing another value, while facilitating communication of each of the multiple software applications 40a, 40b, 40c and 40d with a common interrupt port without the remaining software application 40a, 40b, 40c and 40d sensing the communication.

If more than one of the general-purpose registers 30a, 30b, 30c and 30d have a non-zero value present during a given time, the operating system 34 is operated on by the processor 18 to poll each of the same and callback consecutively all software applications 40a, 40b, 40c and 40d associated therewith.

Association of the software applications 40a, 40b, 40c and 40d with the general purpose registers 30a, 30b, 30c and 30d is achieved by executing the following functions through the FX8210 API function fxCallBackRegisterCallBack function:

@doc APPLET
@func FXSTATUS fxCallbackRegisterCallback
The @func FXSTATUS fxCallbackRegisterCallback function registers a callback to be executed upon processor 18's receipt of a system event, i.e., interrupt.

@comm The callback is executed with the following parameter list:

<f callback_func>(<p callID>, <p ulEvent>, <p ulParam>, <p ulSystemParam>)

with <p calliD> being be the callback ID of the registered function, <p ulEvent> being be the event which causes the callback to be instantiated, <p ulparam>being be the general-purpose parameter being passed to <f fxCallbackRegiseercalJ,back()., and <p ulSystemParam> is the parameter passed from the system. Typically, the aforementioned parameters are 32 bits in length. <p ulSystemPararm> is the value passed from the software applications if the even is <FXEVENT_DSPINTERRUJPT>, and zero otherwise.

a @parm CALLID   pcallid   specifies a pointer to an opaque identifier to be returned by this call.
@parm FXPGMID   pgmID   specifies ID of the DSP program.
@parm FXEVENT   ulEvent   specifies <t FXEVENT> type ORed with a count value (for <t FXEVENT_SAMPLETIMER>only)
@parm (void *) (CALLID,FXEVENT.ULONG, ULONG) fHandler
   specifies callback function address.
@parm ULONG   ulParam   specifies a user-definable general-purpose parameter.
@com: (SUPERUSER)   It is assumed that when this function is called the current Context will still be that of the calling the process. This is because the callback address is translated to an OS handle during the function call.
@rdesc This function returns one of the following:
  @flag FXERROR_NO_ERROR If successful.
  @flag FXERRROR_OUT_OF_MEMORY If not enough host memory to complete operation.
/
FXSTATUS EMUAPIEPORT
fxCallbackRegisterCallback( CALLID 'pcallid, FXPGMID pgmID,
    FXEVENT ulEvent, void (*fHandler)(CALLID, FXEVENT,
    ULONG, ULONG), ULONG ulParam )
(
    FXCALLBACK *pNewCallback;
    FGMLIST *pPgmList;
    ULONG UlcHandle
    CHIPLIST *pSoftware Application;
    OS_WAITMUTEX(fx8210Mutex) ;
    /* Validate pgmID */
    if( !fxPgmValidPgmID((FXID)pgmID) ) (
        OS_RELEASEMUTEX(fx8210Mutex);
        return FXERROR_INVALID_ID;
    }
    /*Allocate a callback structure */
if FX_DYNAMIC
    pFreeCallbackList = OS_MALLOC( size of(FXCALLaAeK) );
endif
    if( !pFreeCallbackList ) (
        OS_RELEASEMUTEX(fx8210Mutex);
        return FXERROR._OUT_OF_MEMORY;
    }
    pNewCallback = pPreecallbackList;
if !FX_DYNAMIC
    pFreeCallbacklist = pFreeCallbackList->pchain;
endif
    /* Fill it in */
    pNewCallback - >callID = (CALLID) pNewCallback;
    pNewCallback - ulEvent = (ulEvent& (-COUNTMASK)
    *denominator)
/numerator;
    pNewCallback - ulFuncHandle = OS_FUNC2HANDLE(fHandler)
    pNewCallback - >ulparam = ulParam;
    pNewCallback - ulResetcounter = (ulEvent&COUNTMASK)
?ulEvent&(-COUNTMASK) :1;
    pNewCallback - >ulCounter = pNewCallback->ulResetCounter;
    /* Attach to head of appropriate pgm list */
    for( pPgmList = pHeadPgmList;
        pPgmList && pPgmList - >pgmID ! = (FXID)pgmID;
        pPgmList = pPgmList->pChain ) ;
    if( !pPgmList ) (
        /* Allocate a pgmlist structure */
        #if FX_DYNAMIC
        pFreePgmList = OS_MALLOC ( sizeof(PGMLIST)
    );
endif
    if( !pFreePgmList) {
if FX_DYNAMIC
        OS_FREE(pNewCallback);
else
        pNewCallback - >pchain - pFreeCallbackList;
        pfreeCallbackList = pNewCallback;
endif
        OS_RELEASEMUTEX(fx8210Mutex);
        return FXERROR_OUT_OF_MEMORY;

-continued

```
        }
        pPgmList = pFreePgmList;
#if !FX_DYNAMIC
        pFreePgmList = pFreePgmList->pChain;
#endif
        pPgmList->pgmID = (FXID);
        pPgmList - > = NULL;
        pPgmList - >pChain = pHeadPgmList;
        pHeadPgmList = pPgmList;
    }
    pNewCallback->pPgmList = pPgmList;
    pNewCallback- >pNextPgm = pPgmList - >cbkList;
    pPgmList->cbkList = pNewcallback;
    /* Now attach to the appropriate event list */
    switch( ulEvent&(-COUNTMASK) ) {
    case FXEVENT_DSPINTERRUPT:
        /* Search for the chip to which this program is attached */
        ulcHandle = fxPgmGetChipHandle ((FXID)pgmID);
        for( pDSP = pFXevent_dspint; pDSP - >
ulChipHandle := uleHandle; pDSP = pDSP - >pchain
);
        pNewCallback - >pChain = pDSP ->cbkList;
        pDSP - >cbkList = pNewCallback;
        break;
    case FXEVENT_SAMPLETIMER:
        /* Tack onto timer list */
        pNewCallback - >pChain = pFXevent_timer;
        pFxevent_timer = pNewCallback;
        break;
    case FXEVENT_SHUTDOWN:
        /* Nothing to do. Shutdown is searched through pgmlist */
        break;
    }
    /* Finally, attach it to the call list */
    pNewCallback - >pCallChain = pHeadCallList;
    pHeadCallList = pNewCallback,
    *pcallid = (CALLID)pNewCallback;
    OS_RELEASEMUTEX (fx8210Mutex);
    return FXERRO_NO_ERROR;
}
```

After an interrupt is received, the operating system 34 calls an fxCallbackDSPInterruptTrap function which search of the DSP that triggered the interrupt and then service and FXEVENT_DSPINTERRUPT callbacks which are registered to the program. The fxCallbackDSPInterruptTrap function is as follows:

```
@parm ULONG ulChipHandle specifies which of the general-purpose
registers is nonzero
@comm
*/
static void
fxCallbackDSPInterruptTrap( ULONG ulChipHandle)
(
    CHIPLIST        *pChip;
    FXCALLBACK      *pCbk
    FXID            pgmID
    ULONG           ulIntVector;
    ADDR            addrIntVector
    ULONG           ulFunc, ulParam0, ulParam2,
                    ulParam3;
    OS_WAITMUTEX (fx8210Mutex);
    /* Find general purpose register that provided interrupt request. */
    for( pChip = pFXevent_dspint; pChip - >ulChipHandle
!=ulChipHandle;
        pChip = pChip - >pchain);
    /*Queue all callbacks whose DSP triggered the interrupt*/
    for( pCbk = pChip - >cbkList;pCbk;pCbk = pCbk->pChain ) (
        pgmID= (pCbk = >pPgmList) - >pgmID;
        addrIntVector = fxPgmGetIntVector (pgmID);
        UlIntVector = fxParaReadGPR(pgmID, addrIntVector);
    if( ulIntVector) (
        fxParamWriteGPR( pgmID, addrIntVector, 0L);
```

-continued

```
        pCbk - >ulCounter = ulIntVector;
        pCbk - >pQ = pDSPEventQ;
        pDSPEventQ = pCbk;
    }
}
OS_RSLEASEMUTEX(fx8210Mutex);
/* Pull callbacks from beginning of queue until there are no more*/
while(PdspEventQ ) (
    OS_WAITMUTEX(fx8210Mutex);
    pCbk = pDSPEventQ;
    pDSPEventQ = (pCbk) ? pCbk - >pQ : NULL;
    ulFunc = pCbk - >ulFuncHandle;
    ulParam0 = pCbk - >callID;
    ulParam2 = pCbk - >ulParam;
    ulParam3 = pCbk - >ulCounter;
    OS_RELEASEMUTEX(fx8210Mutex)
    if( 1pfbk )break;
    OS_CALLBACK( ulFunc, ulParam0, (ULONG)
FXEVENT_DSPINTERRUPT, ulParam2, ulParam3);
    }
}
```

With the present invention, each of a plurality of software applications may use a common interrupt source, independent of the remaining software applications without losing data. Although the invention has been described as employing a EMU10K1/RCHIP processor employing an FX8210 operating system processor, any type of processor and operating system may be included. The scope f the invention, therefore, should not determined solely with respect to the specification, but instead should determined based upon the following claims, including their full scope of equivalents.

What is claimed is:

1. A method to facilitate communication between components of a computer system of the type having a plurality of general purpose registers in data communication with both a memory, storing multiple programs, and a processor via an interrupt control register, said method comprising:

associating each of said multiple programs to a subgroup of said plurality of general purpose registers, with each of the general purpose registers of said subgroup storing a predetermined value;

initiating an interrupt request by varying said predetermined value in one of the general purpose registers of said subgroup, defining an interrupt register;

polling said the general purpose registers of said subgroup; and invoking a callback routine to call back programs associated said interrupt register.

2. The method as recited in claim 1 wherein said associating step associates each of said multiple programs with one of said plurality of general purposes registers, with the program associated therewith being different from the general purpose register associated with the remaining of said multiple programs.

3. The method as recited in claim 1 further including a step, following said invoking step, restoring said predetermined value to said interrupt register.

4. The method as recited in claim 1 wherein said subgroup includes three of said plurality of general purpose registers and further, defining three interrupt registers, with said invoking step includes consecutively invoking a callback routine to call back programs associated said each of said plurality of interrupt registers.

5. The method as recited in claim 1 wherein said subgroup includes more than one of said plurality of general-purpose registers.

6. The method as recited in claim 1 wherein said subgroup includes one of said plurality of general-purpose registers.

7. The method as recited in claim 1 wherein said associating step includes executing a fxCallbackRegisterCallback function.

8. The method as recited in claim 1 wherein said invoking step includes executing a fxCallbackDSPInterruptTrap function.

9. The method as recited in claim 1 wherein said predetermined value is zero and said varying step includes varying said predetermined value to be greater than zero.

10. The method as recited in claim 1 wherein said subgroup includes one of said plurality of general-purpose registers.

11. The method as recited in claim 1 wherein said subgroup includes more than one of said plurality of general-purpose registers.

12. A computer system including:

a processor;

a memory storing multiple programs an interrupt control register;

a plurality of general purpose registers in data communication with said processor, via said interrupt control register, and said memory, with each of said plurality of general purpose registers having a predetermined value stored therein;

means, in data communication with said memory, for associating each of said multiple programs to a subgroup of said plurality of general purpose registers;

means, in data communication with said processor, for initiating an interrupt request by varying said predetermined value in one of the general purpose registers of said subgroup, defining an interrupt register;

means, in data communication with said processor, for polling said the general purpose registers of said subgroup; and means, in data communication with said memory, for invoking a callback routine to call back programs associated said interrupt register.

13. The system as recited in claim 12 wherein each of said multiple programs are associated with one of said plurality of general purposes registers, with the program associated therewith being different from the general purpose register associated with the remaining of said multiple programs.

14. The system as recited in claim 12 further including means, in data communication with said processor, for restoring said predetermined value to said interrupt register.

15. The system as recited in claim 12 wherein said subgroup includes three of said plurality of general purpose registers and further, defining three interrupt registers, with said invoking means consecutively invoking a callback routine to call back programs associated said each of said plurality of interrupt registers.

16. The system as recited in claim 12 wherein said subgroup includes one of said plurality of general-purpose registers.

17. A computer program product to facilitate communication between components of a computer system of the type having a plurality of general purpose registers in data communication with both a memory, storing multiple programs, and a processor via an interrupt control register, said computer program product comprising:

code that associates each of said multiple programs to a subgroup of said plurality of general purpose registers, with each of the general purpose registers of said subgroup storing a predetermined value;

code that initiates an interrupt request by varying said predetermined value in one of the general-purpose registers of said subgroup, defining an interrupt register;

code that polls said the general purpose registers of said subgroup; and code that invokes a callback routine to call back programs associated said interrupt register.

18. The computer program product as recited in claim 17 wherein said code that associates each of said multiple programs with one of said plurality of general purposes registers, with the program associated therewith being different from the general purpose register associated with the remaining of said multiple programs.

19. The computer program product as recited in claim 17 further including a code that restores said predetermined value to said interrupt register.

20. The computer program product as recited in claim 17 wherein said subgroup includes three of said plurality of general purpose registers and, defining three interrupt registers, with said code that invokes consecutively invokes a callback routine to call back programs associated said each of said plurality of interrupt registers.

* * * * *